United States Patent
Nourmohamadian et al.

(10) Patent No.: US 7,162,604 B1
(45) Date of Patent: Jan. 9, 2007

(54) MULTI-USER VIRTUAL TAPE SYSTEM

(75) Inventors: Mohamad Nourmohamadian, Laguna Hills, CA (US); James Walch, Mission Viejo, CA (US)

(73) Assignee: Ultera Systems, Inc., Laguna Hills, CA (US)

( * ) Notice: Subject to any disclaimer, the term of this patent is extended or adjusted under 35 U.S.C. 154(b) by 342 days.

(21) Appl. No.: 10/682,380

(22) Filed: Oct. 8, 2003

Related U.S. Application Data

(60) Provisional application No. 60/417,024, filed on Oct. 8, 2002, provisional application No. 60/425,564, filed on Nov. 12, 2002, provisional application No. 60/459,081, filed on Mar. 31, 2003, provisional application No. 60/473,236, filed on May 24, 2003.

(51) Int. Cl.
*G06F 12/00* (2006.01)

(52) U.S. Cl. .................. 711/168; 711/4; 711/111

(58) Field of Classification Search .......... 711/168, 711/4, 111; 360/69, 70; 703/24
See application file for complete search history.

(56) References Cited

U.S. PATENT DOCUMENTS

| | | | |
|---|---|---|---|
| 5,454,098 A * | 9/1995 | Pisello et al. ............... 703/24 |
| 5,455,926 A | 10/1995 | Keele et al. | |
| 6,098,148 A | 8/2000 | Carlson | |
| 6,173,359 B1 | 1/2001 | Carlson et al. | |
| 6,260,110 B1 | 7/2001 | LeCrone et al. | |
| 6,389,503 B1 | 5/2002 | Georgis et al. | |
| 6,785,078 B1 * | 8/2004 | Basham et al. ............... 360/69 |
| 2002/0144044 A1 | 10/2002 | Moon et al. | |
| 2004/0153614 A1 * | 8/2004 | Bitner et al. ................ 711/162 |

OTHER PUBLICATIONS

Ultera Systems, Inc.; Striper 4 Tape Series Tape Array Controller—User Guide May 2002; Ultera Systems, Inc., Laguna Hills, CA.
Ultera Systems, Inc.; Simply The Fastest Most Reliable Backup/Restore Solution Available 2002; Ultera Systems, Inc., Laguna Hills, CA.
Quantum Corporation; Enhanced Backup Solutions—Quantum DX 30 Nov. 2002; Quantum Corporation, Irvine, CA.

* cited by examiner

*Primary Examiner*—Kimberly McLean-Mayo
(74) *Attorney, Agent, or Firm*—Law Office of Glenn R. Smith; Glenn R. Smith; Lei Liu

(57) ABSTRACT

One or more servers are adapted to execute tape application programs. A controller provides communications between the one or more servers and a random access storage device. The controller is configured so that the application programs can concurrently access the random access storage device as a sequential access tape storage device.

4 Claims, 11 Drawing Sheets

FIG. 1 --PRIOR ART--

MULTI-USER VIRTUAL TAPE SYSTEM

CROSS-REFERENCE TO RELATED APPLICATIONS

This application relates to and claims the benefit of the following prior U.S. Provisional Applications: Application No. 60/417,024 entitled Dual Access Tape filed Oct. 8, 2002; Application No. 60/425,564 entitled Virtual Tape Controller filed Nov. 12, 2002; Application No. 60/459,081 entitled Virtual Tape Controller filed Mar. 31, 2003; Application No. 60/473,236 entitled Virtual Tape Library filed May 24, 2003, all incorporated by reference herein.

BACKGROUND OF THE INVENTION

Computer systems utilize tape storage backup to create duplicate copies of programs, disks or data for archiving purposes or to safeguard valuable files from loss should an active copy be damaged or destroyed. Tape storage is also used for data acquisition and recording and corresponding playback for data analysis. FIG. 1 illustrates a conventional tape storage system 100 having a server 110, an application program 130, a communications channel 150 and tape storage 170. The server 110 runs the application program 130 which manages tape storage 170. Tape storage 170 may be one or more tape drive devices or one or more tape library devices. The data channel 150 provides bi-directional communication for transferring commands and data between the application program 130 and tape storage 170. In particular, data is recorded, i.e. written, from the server 110 to tape storage 170, and data is restored or played back, i.e. read, from tape storage 170 to the server 110.

SUMMARY OF THE INVENTION

The installed base of backup, archive and data acquisition application programs are configured for tape storage. Historically, tape storage is utilized for these applications due to low media cost, large storage capacity and removable media characteristics. Tape storage, however, provides relatively slow data transfer rates. Further, conventional tape storage devices can only be accessed sequentially and thus are limited to one user at a time. That is, accessing a conventional tape storage device by more than one user is impractically slow.

By contrast, when disk storage is viewed as a tape, it provides relatively fast data transfer rates and random access. Further, advances in disk technology have increased disk performance, storage capacity and data reliability as well as reduced cost. The data formats of disk storage and tape storage, however, are incompatible. A virtual tape system based upon disk storage technology converts between tape and disk data formats. By emulating tape devices, the virtual tape system also performs this conversion transparently to existing backup and data acquisition application programs. Further, a virtual tape system can be advantageously configured as a multi-user tape system due to the random access capability of disk storage systems. A virtual tape system is described in U.S. patent application Ser. No. 10/655,764 entitled Virtual Tape System, assigned to the assignee of the present invention and incorporated by referenced herein. Some aspects of a virtual tape system are described with respect to FIGS. 2–3, below.

FIG. 2 illustrates a virtual tape system 200 which has enhanced features and functions compared to a conventional tape system 100 (FIG. 1), described above. The virtual tape system 200 has a virtual tape controller 210, disk storage 230 and optional tape storage 250. The virtual tape controller 210 utilizes the disk storage 230 to create virtual tape volumes 310 (FIGS. 3A–B), described below. In this manner, the virtual tape system 200 appears to the application program 130 as conventional tape storage 170 (FIG. 1), but with the random file access and high data transfer rates of disk storage. Thus, the virtual tape system 200 transparently provides performance enhancements and reliability enhancements to backup, restore and archival applications while preserving investments already made in storage equipment and application software.

FIG. 3A illustrates a disk storage space 300 partitioned into multiple virtual tape volumes 310, unallocated space 330 and look-up tables 350. The virtual tape volumes 310 are described in further detail with respect to FIG. 3B. The unallocated space 330 occurs when the total allocated storage capacity for all of the virtual tape volumes 310 is less than the available disk storage space 300. The look-up tables 350 include a volume management table 352 and one or more data management tables 354 each associated with a corresponding one of the virtual tape volumes 310. After configuring the number of virtual tape volumes 310, a corresponding number of data management lookup tables 354 are generated automatically in a reserved area of the disk storage device, setting each virtual tape volume 310 to an initialized or blank tape state.

As shown in FIG. 3A, the lookup tables 350 provide a conversion mechanism between the sequential tape data format utilized by the server 110 (FIG. 2) and the random disk data format inherent to disk storage 230 (FIG. 2). The volume management table 352 manages an entire disk storage space 300 spanning one or more disk drives. The volume management table 352 stores the number and storage capacity of each disk storage device, one or more virtual tape drive descriptor tables, and pointers to one or more data management tables. The virtual tape drive descriptor tables manage the full or empty status of each virtual tape drive and, if full, which virtual tape volume is currently mounted. Each data management table 354 stores the storage capacity size and starting logical block address (LBA) for each virtual tape volume 310, a virtual tape volume descriptor and multiple table entries, described with respect to FIG. 3B, below. For virtual tape library operation in a random tape library mode, the volume management table can also contain a library element descriptor table to manage each virtual tape drive element, each virtual tape volume element, each virtual data entry/exit mailbox element and one or more virtual robotic media changer elements.

FIG. 3B illustrates a typical virtual tape volume 310, each of which appears to the server 110 (FIG. 2) as a physical tape volume, such as a tape cartridge, when it is mounted in a virtual tape drive 220 (FIG. 2). A virtual tape volume spans 310 from the beginning of a sector having a first LBA and representing the beginning-of-tape BOT 312 to the end of a sector having a last LBA and representing the end-of-tape EOT 314. As sequential tape blocks are written to a virtual tape volume 310, the tape block position pointer 320 is incremented to equal the number of tape blocks written plus one which also equals the current end-of-data EOD 319 tape block position. When the position of the tape block pointer is set to EOD 319 and new tape blocks are written, the position of EOD 319 changes and it is incremented by the number of tape blocks written. The position of the tape block pointer 320 can be moved to point to any tape block position within the virtual tape volume up to the EOD 319 position using media access commands such as locate, space, rewind and load. The volume descriptor, referenced above, stores LBAs 312, 314, an indication of the virtual tape volume status as full or empty, the LBA of the EOD 319 position, and the LBA of the start of the early warning zone 316.

The data management table entries, referenced above, each store various tape events, such as file marks, set marks, changes in block size, beginning and end of media and the tape block positions corresponding to each of these events. Once a virtual tape volume 310 is mounted in a virtual tape drive 220 (FIG. 2), it behaves and operates as if it was loaded in a conventional tape drive. All tape drive commands that access the virtual tape drive 220 (FIG. 2) are managed by the virtual tape controller 210 (FIG. 2) using a data management table 354 (FIG. 3A) to track the current tape position 320, current tape block size and the tape block attributes. One or more virtual tape drives 220 (FIG. 2) are simulated by the virtual tape controller 210 (FIG. 2) to operate as sequential tape target devices. Each virtual tape drive 220 (FIG. 2) utilizes a user defined personality or a personality derived from one or more physical tape drives 250 (FIG. 2) attached to the virtual tape controller 210 (FIG. 2). Defining and deriving a tape drive personality is described in U.S. patent application Ser. No. 10/655,763 entitled Tape Storage Emulator, assigned to the assignee of the present invention and incorporated by reference herein. The operational characteristics of each virtual tape drive 220 (FIG. 2) are simulated by the virtual tape controller 210 (FIG. 2) utilizing volume management tables 352 and data management tables 354. These tables are used to control the virtual tape drives behavior in response to sequential tape drive commands as they are converted to random access disk commands.

One aspect of a multi-user virtual tape system comprises one or more servers adapted to execute tape application programs and a random access storage device. A controller provides communications between the one or more servers and the random access storage device. The controller is configured so that the application programs can concurrently access the random access storage device as a sequential access tape storage device.

Another aspect of a multi-user virtual tape system comprises a data portion of disk storage formatted as a tape volume. Application programs are in communications with the disk storage. Pointers each independently indicate tape block positions within the tape volume. The application programs correspond to the pointers so as to enable the application programs to concurrently access the tape volume.

Yet another aspect of a multi-user virtual tape system is a method providing disk storage and defining a virtual tape volume on the disk storage. The virtual tape volume is associated with a virtual tape drive. Tape formatted data is concurrently communicated between the virtual tape drive and application programs.

DETAILED DESCRIPTION OF THE PREFERRED EMBODIMENTS

Overview

Figure 1:
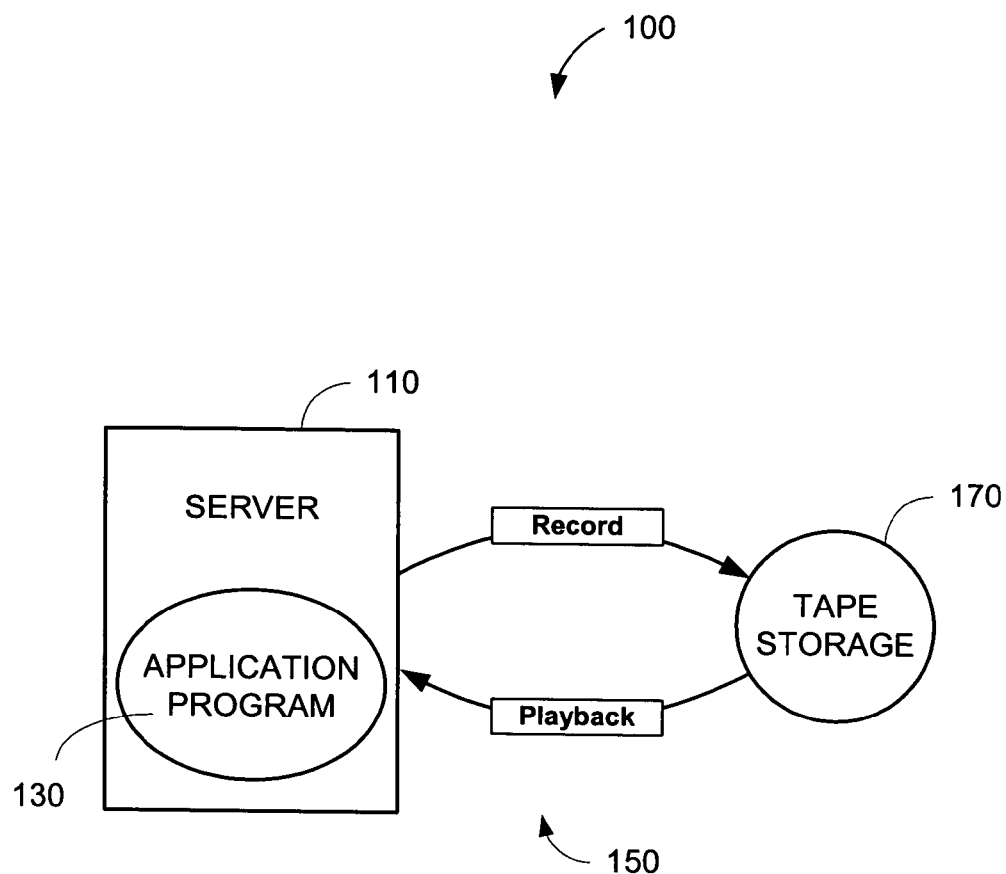
FIG. 1 is a block diagram of a prior art tape system.
Figure 2:
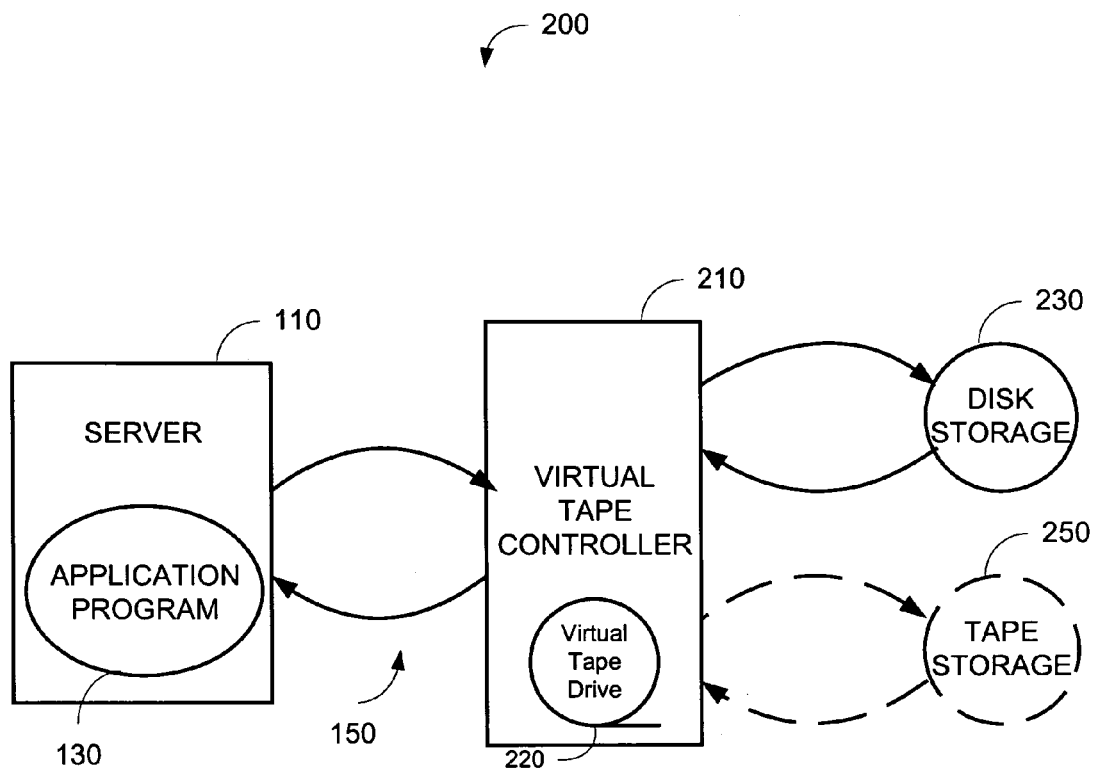
FIG. 2 is a block diagram of a virtual tape system.
Figure 3A:
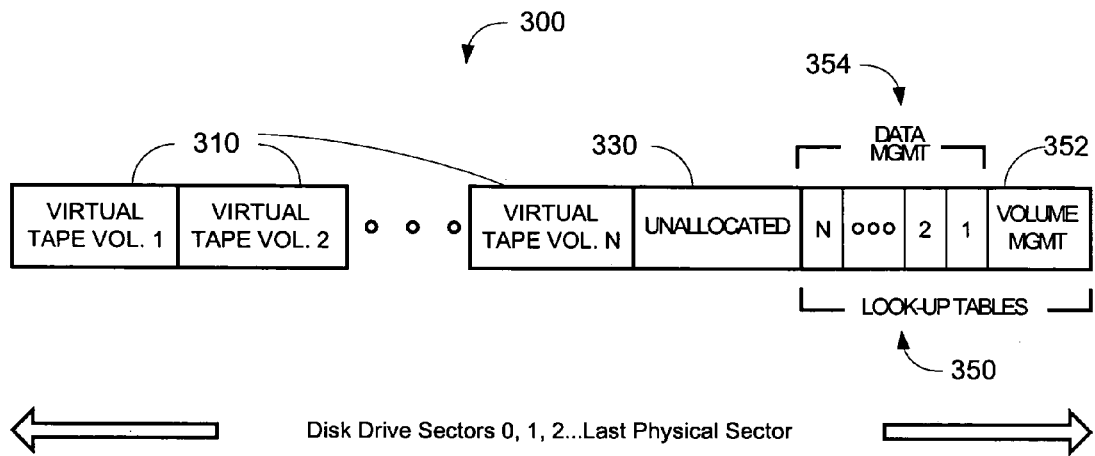
FIGS. 3A–B are depictions of virtual tape volumes on disk storage.
Figure 3B:
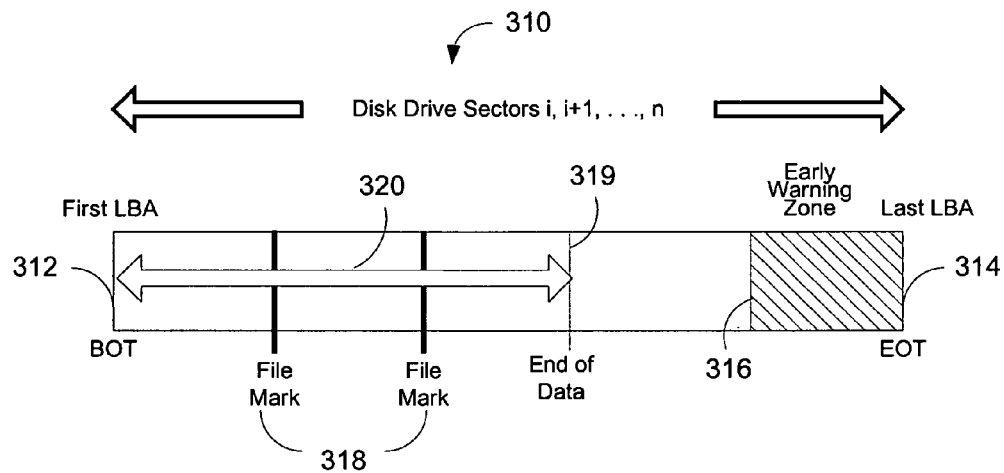
Figure 4:
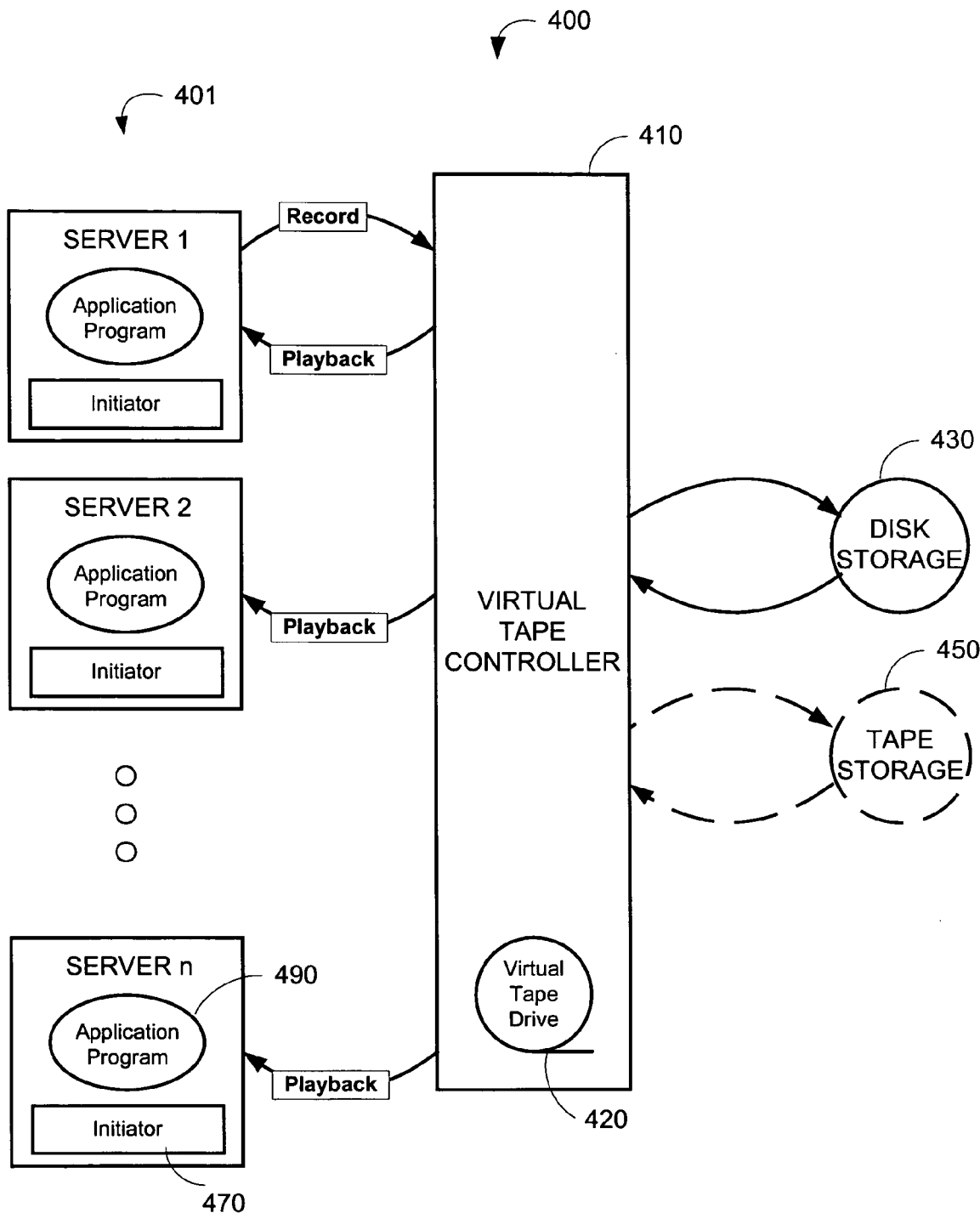
FIG. 4 is a top-level block diagram of a multi-user virtual tape system.

FIG. 4 illustrates a multi-user virtual tape system 400. A virtual tape system can be advantageously configured as a multi-user tape system due to the random access capability of disk storage systems. As mentioned above, multi-user access is impractical for sequentially-accessed conventional tape storage. A multi-user virtual tape system allows one user to write data while one or more users concurrently read the recorded data. Each tape data block can be read immediately after it is written without interrupting a data acquisition or tape backup process. If an attempt is made to read beyond the last recorded tape block or position beyond the current EOD 319 (FIG. 3) position, a check condition status is posted with error sense data indicating a "blank check" or end of data error. Read operations access new tape data blocks as they become available. A multi-user virtual tape system can utilize multiple host bus initiators or multiple virtual tape drives to concurrently access the same virtual tape volume data by multiple users.

As shown in FIG. 4, a multi-user virtual tape system 400 has a virtual tape controller 410 and disk storage 430. A virtual tape controller 410 is described in U.S. patent application Ser. No. 10/655,764 entitled Virtual Tape System, cited above. In particular, the virtual tape controller 410 converts between tape storage format and disk storage format so as to allow disk storage 430 to be viewed as virtual tape storage. This provides one or more servers 401 with the relatively fast data transfer rates and random access capabilities of disk storage 430 while maintaining compatibility with existing tape-based application programs 490. Further, the virtual tape controller 410 transparently emulates tape storage devices so as to transparently appear to the servers 401 as a particular tape device. The disk storage 430 can be any of various random access storage devices, such as magnetic disk, optical disk, magneto-optical disk to name a few. The multi-user tape system 400 may also have tape storage 450 that provides simultaneous recording to a virtual tape volume 700 (FIGS. 7A–B) and a physical tape media cartridge while providing real-time playback directly from the virtual tape volume.

A multi-user tape system 400 may operate as a virtual tape library in a sequential stacker mode or a random tape library mode. A sequential stacker is described in U.S. patent application Ser. No. 10/655,948 entitled Virtual Tape Stacker, assigned to the assignee of the present invention and incorporated by reference herein. Random tape library operation requires the volume management table 352 (FIG. 3A) to contain a library element descriptor table to manage each virtual tape drive element, each virtual tape volume element, each virtual data entry/exit mailbox element and one or more virtual robotic media changer elements. After a multi-user tape drive is unloaded by all of the configured number of initiators 470 (or virtual tape drive 420 targets), the next virtual tape volume can be loaded automatically as a sequential stacker or by using a random tape library operation. As an alternative, when the write enabled initiator (or virtual tape drive target) performs an unload operation, the multi-user tape drive is unloaded, including each configured initiator (or virtual tape drive target) at the same time.

A single-user virtual tape system embodiment and multi-user virtual tape system embodiments are described below with respect to FIGS. 5 and 6, respectively, for comparison. Although the single-user embodiment and multi-user embodiments are described separately for clarity, these embodiments could be combined, where some virtual tape drives are single-user and others are multi-user.

Single User Virtual Tape System

Figure 5:
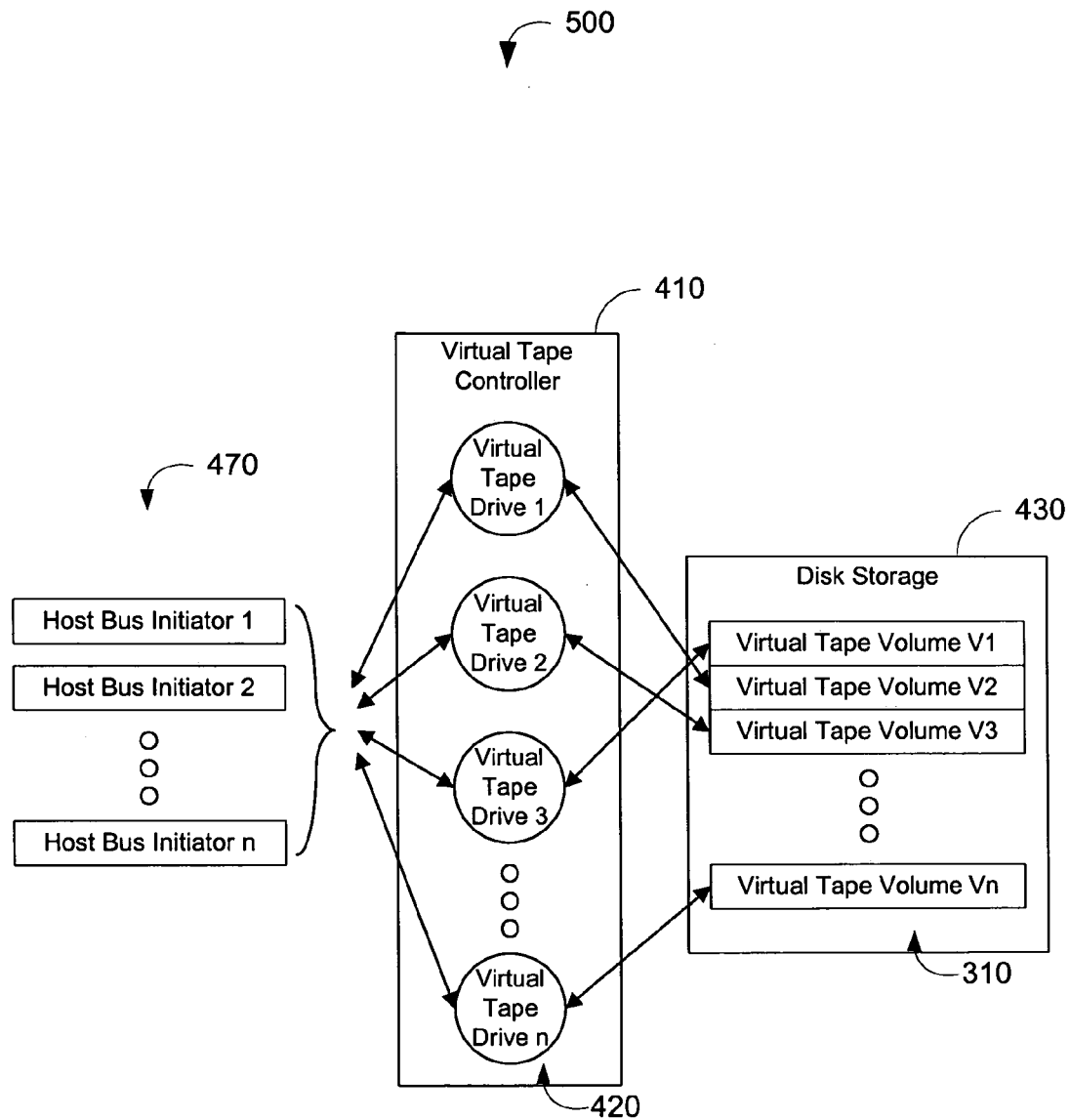
FIG. 5 is a block diagram of a single-user virtual tape system embodiment.

FIG. 5 illustrates a single user virtual tape system 500 having one or more initiators 470 operating from one or more servers 401 (FIG. 4), a virtual tape controller 410 and disk storage 430. The virtual tape controller 410 creates one or more virtual tape drives 420 as target devices. Each virtual tape drive 420 is operated as a single user device in the same way as a conventional tape drive. That is, the functional characteristics of a virtual tape drive 420 are equal to the functional characteristics of a conventional tape drive. The virtual tape drive 420, however, operates without conventional tape positioning latency and provides increased reliability, performance and random access to user data.

As shown in FIG. 5, disk storage 430 is organized to comprise one or more virtual tape volumes 310. Each virtual tape volume 310 represents a physical tape media cartridge to store tape blocks in a sequential tape data format. The virtual tape controller 410 manages each virtual tape volume 310 so only one instance of each virtual tape volume 310 can be mounted into a virtual tape drive 420 at any one time. This allows existing tape management programs to manage each virtual tape volume in the same way a physical tape media cartridge is managed whether the virtual tape system operates as a virtual tape drive 420 or a virtual tape library in a sequential stacker mode or a random tape library mode. When a virtual tape volume 310 is mounted into a virtual tape drive 420, it is not available to be mounted into any other virtual tape drive 420. Each virtual tape drive 420 operates independent of other virtual tape drives 420. If an attempt is made to read beyond the last recorded tape block or position beyond the current EOD 319 (FIG. 3) position, a check condition status is posted with error sense data indicating a "blank check" or end of data error. As new data is written, the new tape blocks can be read immediately.

Multi-User Virtual Tape System

Figure 6A:
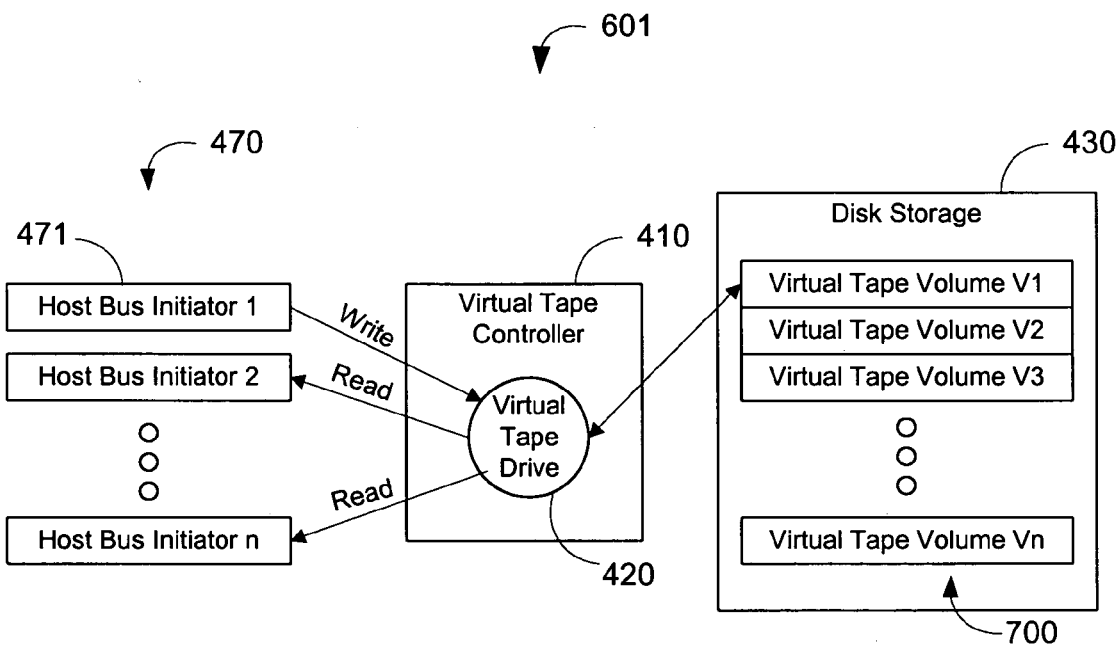
FIGS. 6A–C are block diagrams of multi-user virtual tape system embodiments.
Figure 6B:
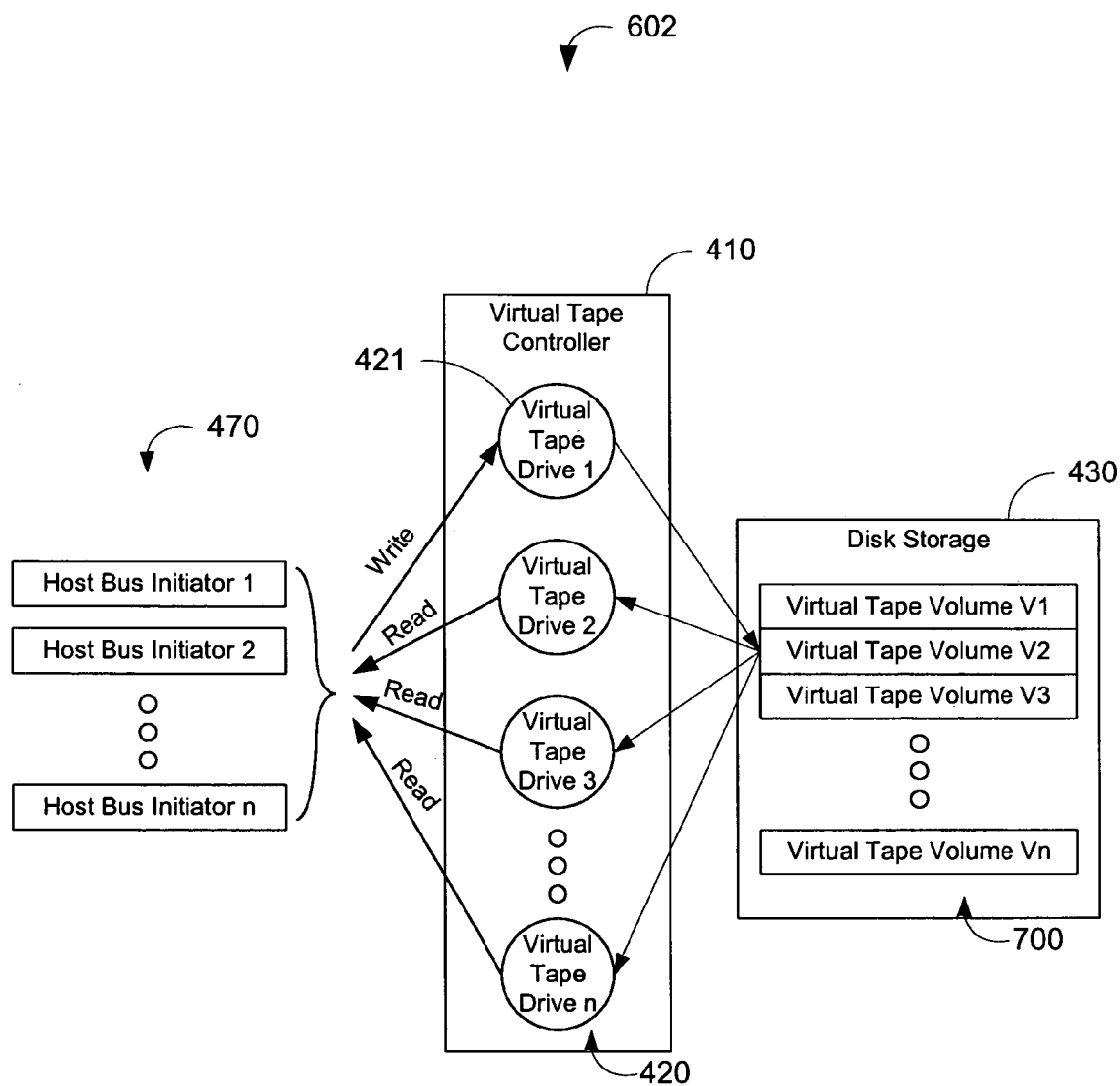
Figure 6C:
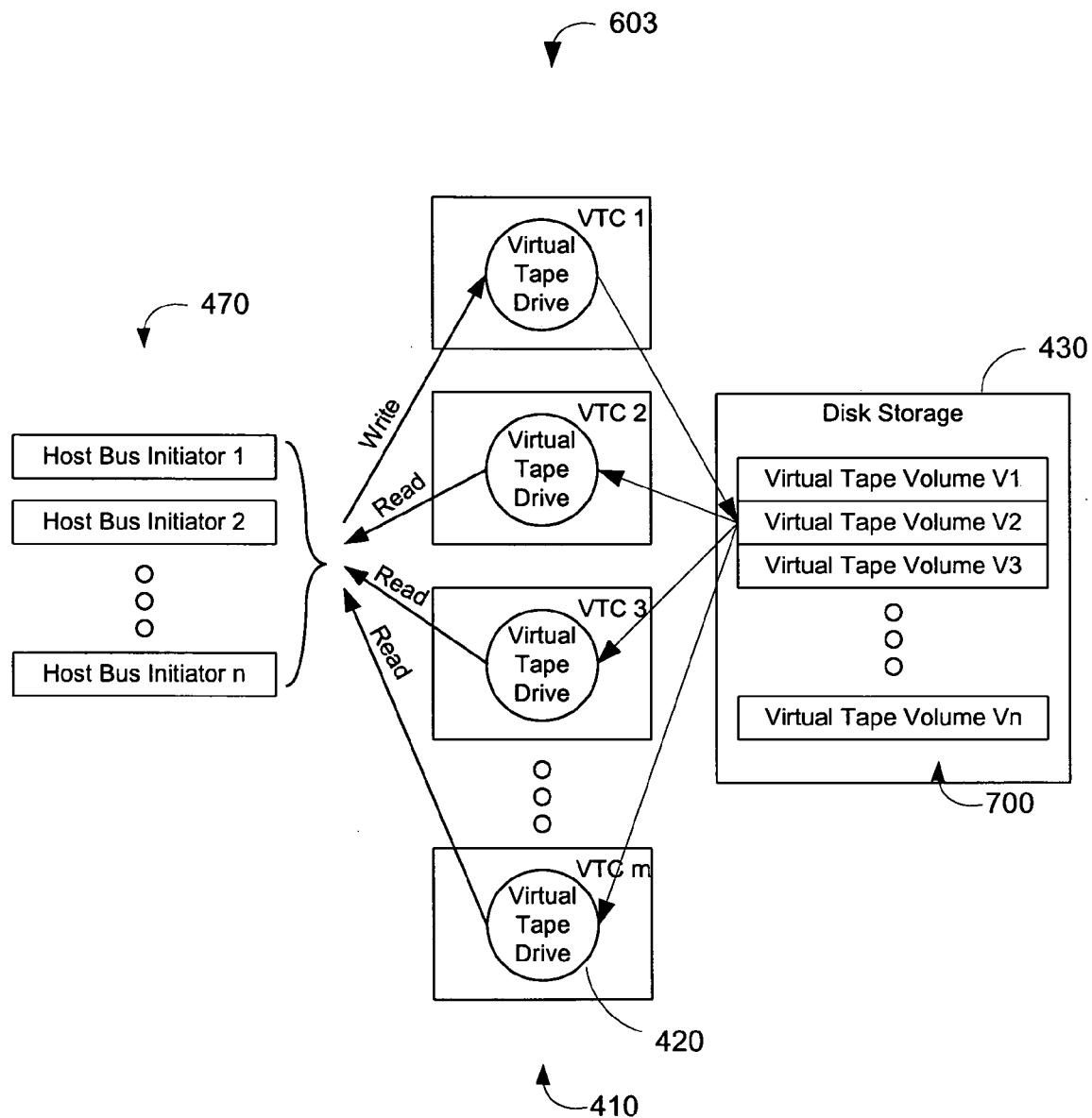

FIGS. 6A–C illustrate various multi-user virtual tape system embodiments. FIG. 6A illustrates a single virtual tape drive target embodiment 601, FIG. 6B illustrates a multiple virtual tape drive target embodiment 602, and FIG. 6C illustrates a multiple virtual tape controller embodiment 603. As shown in FIG. 6A, a virtual tape controller 410 creates a single virtual tape drive 420 target that can be accessed by multiple host bus initiators 470 as if each initiator 470 has exclusive access to the virtual tape drive 420 target. Each initiator 470 and an associated application program 490 (FIG. 4) operates the virtual tape drive 420 as if it was a single user tape drive independent of other initiators 470. The virtual tape controller 410 identifies each initiator 470 and manages them independently. Each initiator 470 is assigned a different tape block position pointer 710 (FIG. 7A) that is independent of other initiators 470 that may be present. Since the tape block position pointers 710 (FIG. 7A) are independent, each initiator 470 can be accessing or pointing to a different area of the previously recorded virtual tape volume data at the same time.

Also shown in FIG. 6A, when a virtual tape volume 700 is mounted into a virtual tape drive 420, it is not available to be mounted into any other virtual tape drive 420. Write operations can only be performed by one of the initiators 470 to a virtual tape drive 420. The write enabled initiator 471 can be pre-designated or designated after a virtual tape volume 700 is mounted into a virtual tape drive 420. The first initiator 470 to perform a write operation is set to be write enabled while all of the other initiators 470 are set to be write protected. If an initiator 470 that is write protected attempts a write operation, the virtual tape drive 420 terminates the command with a check condition status due to a data protect error. If an initiator 470 unloads the virtual tape volume 700 from the virtual tape drive 420, the other initiators 470 continue to operate independently with uninterrupted access to the same virtual tape volume 700 In the case where the write enabled initiator 471 unloads the virtual tape volume 700 from the virtual tape drive 420, a different or alternate initiator 470 can be set to be write enabled. Only the write enabled initiator 471 can modify or change the virtual tape volume data management lookup tables. All of the other initiators 470 access the virtual tape drive 420 for read only operations. If any of the initiators 470 attempt to read beyond the last recorded tape block or position beyond the current EOD 319 (FIG. 3) position, a check condition status is posted with error sense data indicating a "blank check" or end of data error. As new data is written, the new tape blocks can be read immediately.

As shown in FIG. 6B, a virtual tape controller 410 creates multiple virtual tape drive 420 targets that each provide access to the same virtual tape volume data. The multi-user virtual tape drive 420 targets allow more than one instance of a single virtual tape volume 700 to coexist. Each virtual tape drive 420 and an associated application program 490 (FIG. 4) operates independent of other virtual tape drives 420. The virtual tape controller 410 manages each virtual tape drive 420 independently. Each virtual tape drive 420 uses its own tape block position pointer 720 (FIG. 7B) that is independent of other virtual tape drives 420 that may be present. Because the tape block position pointers 720 (FIG. 7B) are independent, each virtual tape drive 420 can be accessing or pointing to a different area of the previously recorded virtual tape volume data at the same time. When a virtual tape volume 700 is mounted into one of the virtual tape drives 420, it is mounted into the other associated virtual tape drives 420 automatically. That is, the multi-user virtual tape system is comprised of two or more virtual tape drives 420 that each access the same virtual tape volume 700 data concurrently.

Also shown in FIG. 6B, only one of the virtual tape drives 420 is allowed to perform write operations. The write enabled virtual tape drive 420 can be pre-designated or designated after a virtual tape volume 700 is mounted into a virtual tape drive 420. The first virtual tape drive 420 that processes a write operation is set to be write enabled while all of the other virtual tape drives 420 are set to be write protected. If an application program 490 (FIG. 4) sends a write operation to a virtual tape drive 420 that is write protected, the virtual tape drive 420 terminates the command with a check condition status due to a data protect error. If a virtual tape drive 420 is unloaded, the other virtual tape drives 420 continue to operate independently with uninterrupted access to the same virtual tape volume 700. In the case where the write enabled virtual tape drive 421 is unloaded, a different or alternate virtual tape drive 420 can be set to be write enabled. The write enabled virtual tape drive 421 can modify or change the virtual tape volume data management lookup tables while the other virtual tape drives 420 are allowed to perform read only operations. If any of the virtual tape drives 420 attempt to read beyond the last recorded tape block or position beyond the current EOD 319 (FIG. 3) position, a check condition status is posted with error sense data indicating a "blank check" or end of data error. As new data is written, the new tape blocks can be read immediately.

As shown in FIG. 6C, a multi-user virtual tape system can be configured with multiple virtual tape controllers 410. Each additional virtual tape controller 410 provides increased bandwidth and performance allowing different areas of the same virtual tape volume 700 to be concurrently played back independent of the other virtual tape controllers 410. In this case, the virtual tape volumes 700 located on the disk storage device 430 are shared among multiple virtual tape controllers 410. Each virtual tape controller 410 operates as one or more multi-user virtual tape drive targets 420 allowing concurrent access to a single virtual tape volume 700.

Figure 7A:
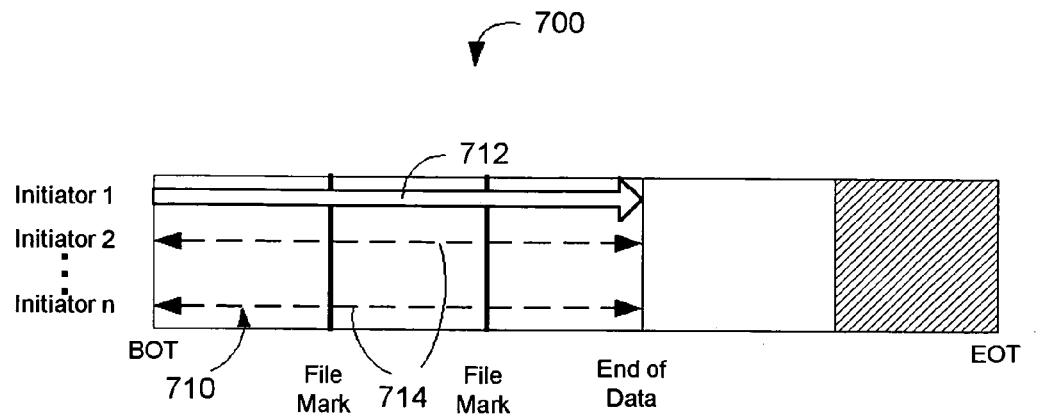
FIGS. 7A–B are depictions of virtual tape volumes illustrating multiple independent tape block position pointers.
Figure 7B:
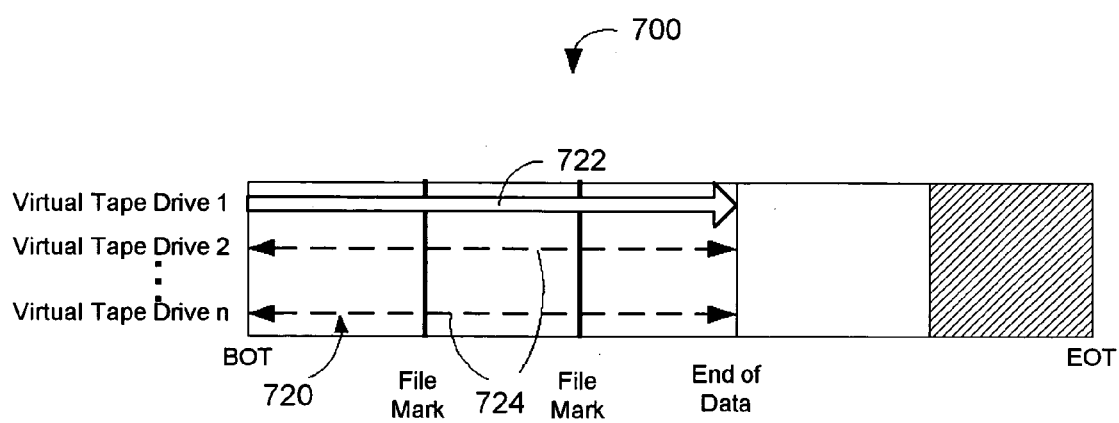

FIGS. 7A–B illustrate a virtual tape volume 700. As shown in FIG. 7A, when using multiple initiators 470 (FIG. 6A), the virtual tape controller 410 (FIG. 6A) provides a multi-user virtual tape device function by managing multiple independent tape block position pointers 710 assigned to each independent initiator 470 (FIG. 6A). Each initiator 470 (FIG. 6A) uses an independent tape block position pointer 710 to concurrently access the same virtual tape volume 700. The virtual tape controller 410 (FIG. 6A) manages all file marks, set marks and block size changes in a virtual tape volume data management look-up table. A multi-user tape function based on multiple initiators 470 (FIG. 6A) utilizes the virtual tape volume data management look-up table 354 (FIG. 3A) with additional tape block position pointers 710.

Also shown in FIG. 7A, initiator 1 is write enabled and records data to the virtual tape volume using an independent tape block position pointer 712 while initiator 2 thru initiator n concurrently playback or read data from the same virtual tape volume 700 using independent tape block position pointers 714. If an attempt is made to read beyond the last recorded tape block or position beyond the current EOD 319 (FIG. 3) position, a check condition status is posted with error sense data indicating a "blank check" or end of data error. The next read command will return new tape blocks as they become available.

As shown in FIG. 7B, when using multiple virtual tape drive targets 420 (FIG. 6B), the virtual tape controller 410 (FIG. 6B) provides the multi-user tape drive function by managing multiple independent virtual tape drives 420 (FIG. 6B) that each use an independent tape block position pointer 720 to concurrently access the same virtual tape volume 700. The virtual tape controller 410 (FIG. 6B) manages all file marks, set marks and block size changes in a virtual tape volume data management look-up table 354 (FIG. 3A). A multi-user virtual tape function based on multiple virtual tape drives 420 (FIG. 6B) utilizes the virtual tape volume data management look-up table 354 (FIG. 3A) with additional tape block position pointers 720.

Also shown in FIG. 7B, the virtual tape drive 1 is write enabled and records data to the virtual tape volume 700 using an independent tape block position pointer 722 while virtual tape drive 2 thru virtual tape drive n concurrently playback or read data from the same virtual tape volume using independent tape block position pointers 724. If an attempt is made to read beyond the last recorded tape block or position beyond the current EOD 319 (FIG. 3) position, a check condition status is posted with error sense data indicating a "blank check" or end of data error. The next read command will return new tape blocks as they become available.

Virtual Tape Controller Firmware

Figure 8A:
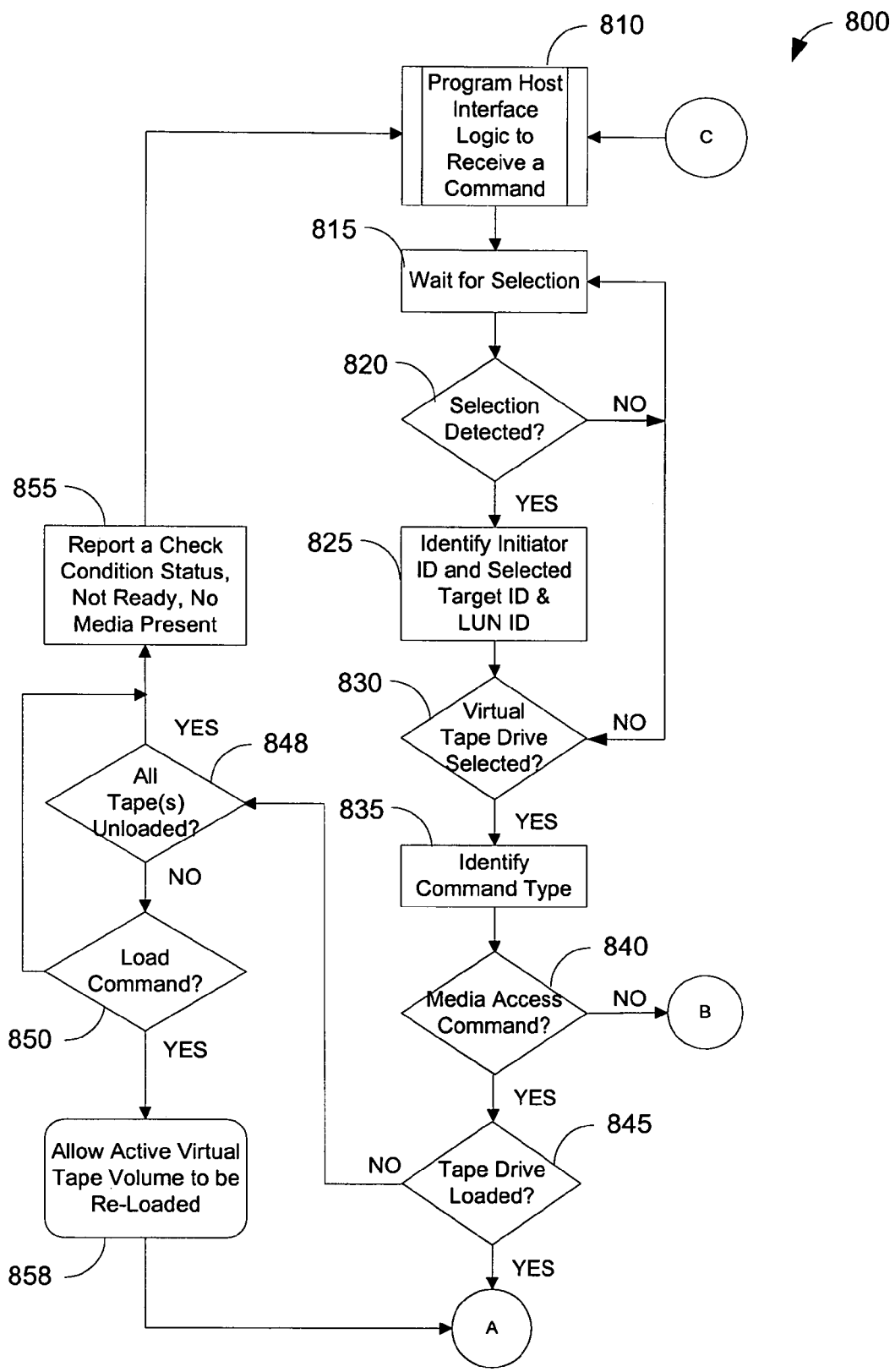
FIGS. 8A–B are flowcharts of multi-user virtual tape controller firmware.
Figure 8B:
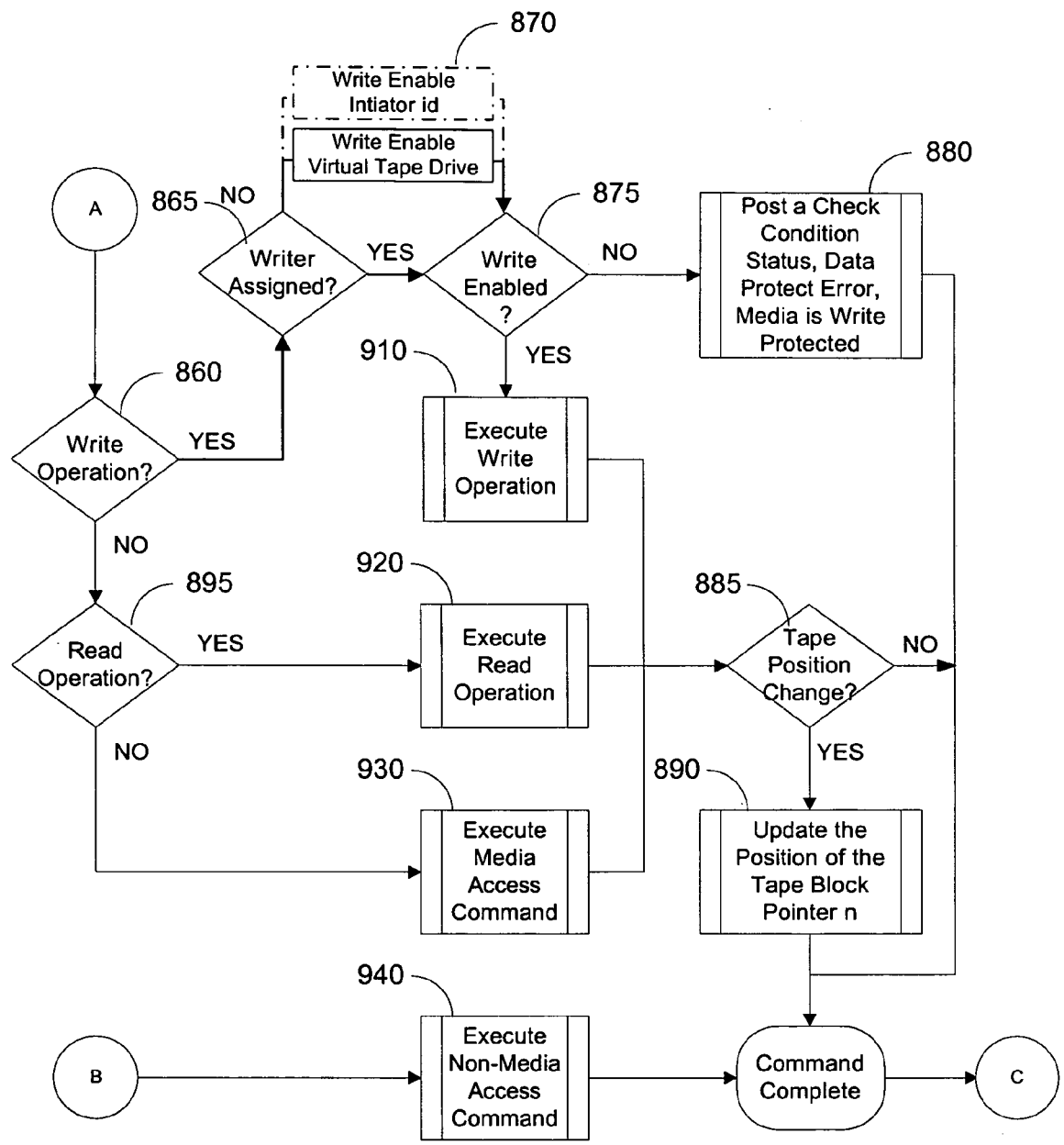

FIGS. 8A–B illustrate controller firmware 800 for a multi-user virtual tape system. As shown in FIG. 8A, the virtual tape controller 410 (FIG. 4) programs the host interface logic to operate in a target mode 810 and wait for an initiator selection 815 of virtual tape drive. When a selection is detected 820, the initiator id, target id and LUN (logical unit number) id are identified 825. If these correspond to a virtual tape drive 830, then a command type is identified 835. Otherwise, the wait for selection 815 continues. If the command is a non-media access type 840, a non-media access command is executed 940 (FIG. 8B). Otherwise, a determination is made if the selected virtual tape drive is loaded 845. If the virtual tape drive is loaded, it is determined if the command is a write operation 860 (FIG. 8B) or a read operation 895 (FIG. 8B), or another media access command 930. Otherwise, if all of the initiators (virtual tape drive targets) have unloaded 850 the virtual tape volume, then a not ready status is returned to the initiator 855 indicating that no media is present. If at least one of the initiators (virtual tape drive targets) have a virtual tape volume loaded and the command is a load command 850, the active virtual tape volume is re-loaded 858 for access by the selected initiators (virtual tape drive targets), otherwise, a not ready status is returned to the initiator 855.

As shown in FIG. 8B, write operations such as write, write file mark and erase media access commands require the virtual tape drive to be write enabled in order to be executed. As described above, the write enabled initiator (or virtual tape device target) can be pre-designated or automatically assigned to the first initiator (or virtual tape device target) to process a write operation after a virtual tape volume is first loaded into a multi-user tape device. Thus, if a writer is not assigned 865, the first writer is write enabled 870. As described above, only one initiator (or virtual tape device target) can be write enabled at a time while all of the other initiators (or virtual tape device targets) are write protected. Thus, if the initiator (or virtual tape device target) is not write enabled 875, a write operation is terminated with a check condition status due to a data protect error 880. If the virtual tape volume for an initiator (or virtual tape device target) is unloaded, the other virtual tape drives continue to operate independently with uninterrupted access to the same virtual tape volume. In the case where the write enabled virtual tape drive is unloaded, a different or alternate virtual tape drive can be set to be write enabled as described above. If the initiator (or virtual tape device target) is write enabled 875, a write operation is executed 910. After a write operation completes, if the tape block position changed 885, the tape block pointer n for the active initiator (or virtual tape device target) is incremented by the number of tape blocks written for the associated application program 890.

Further shown in FIG. 8B, if the command is a read operation 895, then a read operation is executed 920 or a media access command is executed 930 by the virtual tape controller accessing the virtual tape volume data in the selected virtual tape drive. After a read operation completes, the tape block pointer n for the active initiator (or virtual tape device target) is incremented by the number of tape blocks processed for the associated application program 890. Similarly, after a media access command executes, such as locate, space, rewind and load/unload, the tape block pointer n for the active initiator (or virtual tape device target)

is incremented by the number of tape blocks processed for the associated application program 890. Test unit ready and read position media access commands do not change the position of the tape block pointer 885. A read position command reports the current position of the tape block pointer n for the associated application program using the active initiator (or virtual tape device target). Non-media access commands such as inquiry, mode sense, mode select, log sense, log select, request sense, read block limits and prevent media removal are executed 940 and do not change the position of the tape block pointer n for the active initiator (or virtual tape device target) and the associated application program. The firmware for write 910, read 920, media access 930 and non media access 940 commands are described in U.S. patent application Ser. No. 10/655,764 entitled Virtual Tape System, cited above.

A multi-user virtual tape system has been disclosed in detail in connection with various embodiments. These embodiments are disclosed by way of examples only and are not to limit the scope of the claims that follow. One of ordinary skill in art will appreciate many variations and modifications.

What is claimed is:

1. A multi-user virtual tape system comprising:
   at least one server;
   a plurality of application programs residing on the at least one server;
   a plurality of host bus initiators associated with the application programs;
   a random access storage device;
   a virtual tape controller providing communications between the at least one server and the random access storage device and allowing the application programs access to the random access storage device as a sequential access tape storage device;
   a virtual tape volume configured on the random access storage device for tape formatted data;
   a write-enabled one of the host bus initiators designated to perform a record of tape formatted data to the virtual tape volume; and
   a write-protected at least one of the host bus initiators designated to perform a playback of tape formatted data from the virtual tape volume,
   wherein the virtual tape controller allows the playback to operate during the record.

2. The multi-user virtual tape system according to claim 1 further comprising:
   at least one virtual tape drive defined by the virtual tape controller and operated by at least one of the host bus initiators,
   wherein the virtual tape volume is mounted in the at least one virtual tape drive, and
   wherein each of the host bus initiators has independent access to the virtual tape volume.

3. The multi-user virtual tape system according to claim 2 further comprising:
   a first one of the host bus initiators having performed a write operation after the virtual tape volume is initially mounted in the at least one virtual tape drive,
   wherein the virtual tape controller designates the first one of the host bus initiators as the write-enabled one of the host bus initiators.

4. The multi-user virtual tape system according to claim 3 wherein at least one the host bus initiators is able to perform one of a load operation and an unload operation on the virtual tape volume independent of others of the host bus initiators.

\* \* \* \* \*